(12) United States Patent
Eckert et al.

(10) Patent No.: US 11,046,151 B2
(45) Date of Patent: Jun. 29, 2021

(54) HEATING DEVICE WITH INTEGRATED TEMPERATURE SENSOR

(71) Applicant: Webasto SE, Stockdorf (DE)

(72) Inventors: Daniel Eckert, Stockdorf (DE); Hans Rechberger, Stockdorf (DE); Stephan Buckl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 348 days.

(21) Appl. No.: 15/520,539

(22) PCT Filed: Oct. 16, 2015

(86) PCT No.: PCT/EP2015/074013
§ 371 (c)(1),
(2) Date: Apr. 20, 2017

(87) PCT Pub. No.: WO2016/062631
PCT Pub. Date: Apr. 28, 2016

(65) Prior Publication Data
US 2017/0313160 A1    Nov. 2, 2017

(30) Foreign Application Priority Data
Oct. 21, 2014   (DE) ................ 10 2014 015 586.2

(51) Int. Cl.
*B60H 1/22*        (2006.01)
*H05B 3/22*        (2006.01)
(Continued)

(52) U.S. Cl.
CPC ......... *B60H 1/2221* (2013.01); *B60H 1/2215* (2013.01); *F24H 1/121* (2013.01);
(Continued)

(58) Field of Classification Search
CPC ...... B60H 1/22; B60H 1/2221; B60H 1/2215; B60H 1/2218; B60H 1/2227;
(Continued)

(56) References Cited

U.S. PATENT DOCUMENTS 4,773,588 A * 9/1988 Okada .................. F23N 1/022
                                            237/2 A
5,497,941 A * 3/1996 Numazawa ............ B60H 1/004
                                            237/2 A
(Continued)

FOREIGN PATENT DOCUMENTS

DE       19645179 A1    5/1998
DE       10051867 A1    4/2002
(Continued)

OTHER PUBLICATIONS

Bohlender et al (English Machine Translation of document EP 2772375) (Year: 2014).*

(Continued)

*Primary Examiner* — Robert J Utama
*Assistant Examiner* — Ayub A Maye
(74) *Attorney, Agent, or Firm* — Quarles & Brady LLP

(57) ABSTRACT

The present invention relates to a heating device (10), in particular to an electric heating device for a motor vehicle, having a heat exchanger housing (12), heat exchanger core (14) which absorbs heat at a heat input face, and a printed circuit board (20) having electronic components (16, 18) for controlling the heating device (10), wherein the printed circuit board (20) is arranged on an outer side (22) of the heat exchanger housing (12), wherein a temperature sensor (24) is arranged on a side (26) of the printed circuit board (20) which faces the outer side (22) of the heat exchanger housing (12), wherein connecting means (28) are provided which connect the temperature sensor (24) in a heat con- (Continued)

Figure 1:
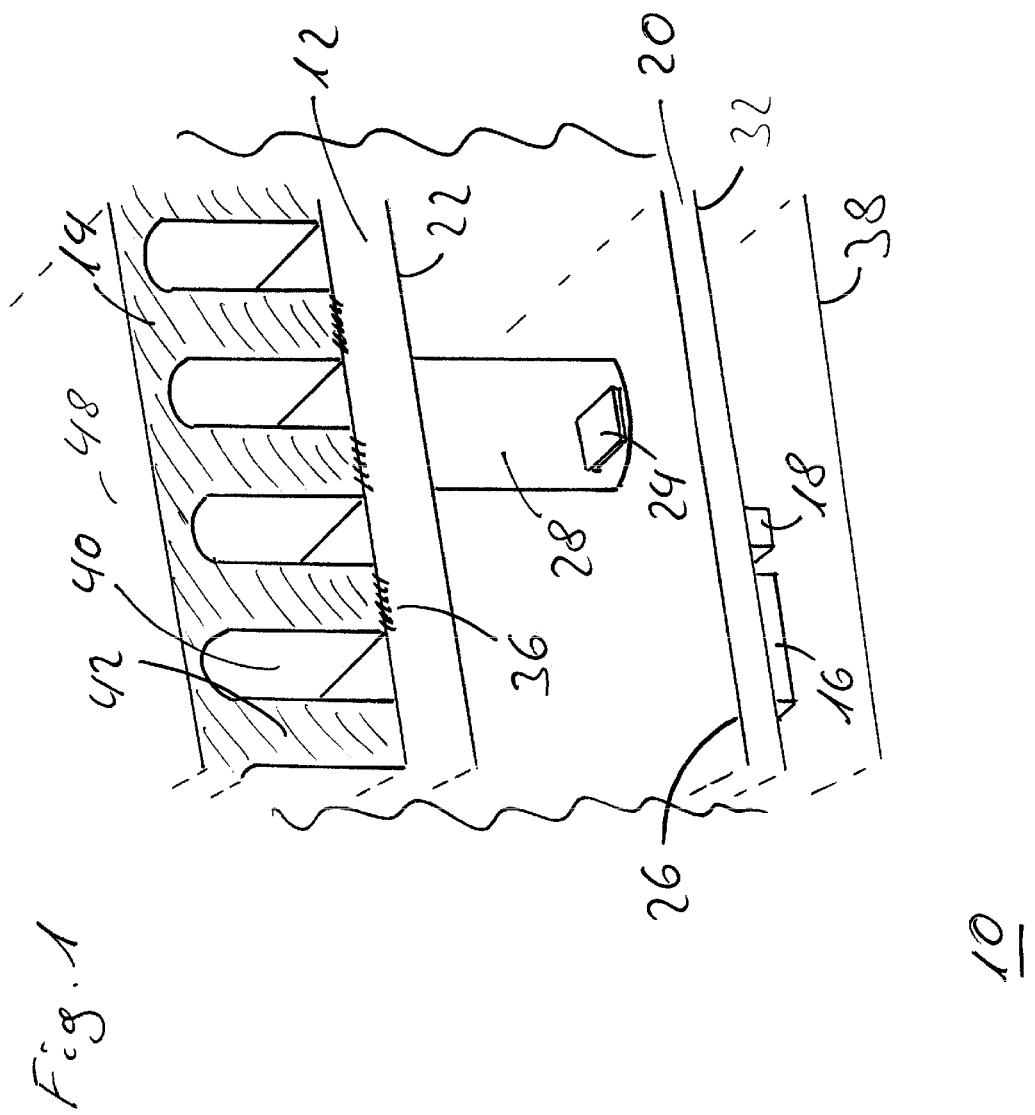

ducting fashion to the outer side (22) of the heat exchanger housing (12), and wherein the heat input face of the heat exchanger core (14) is connected in a heat-conducting fashion to the heat exchanger housing (12), with the result that a continuous short heat bridge, running through the interior of the heat exchanger housing (12), to the connecting means (28) is generated.

7 Claims, 2 Drawing Sheets

(51) Int. Cl.
  *G01K 1/16* (2006.01)
  *F24H 1/12* (2006.01)
  *F24H 9/20* (2006.01)
  *F24H 3/04* (2006.01)
(52) U.S. Cl.
  CPC ......... *F24H 3/0429* (2013.01); *F24H 9/2014* (2013.01); *F24H 9/2071* (2013.01); *G01K 1/16* (2013.01); *H05B 3/22* (2013.01); *B60H 2001/2246* (2013.01); *B60H 2001/2256* (2013.01); *G01K 2205/00* (2013.01); *H05B 2203/021* (2013.01); *H05B 2203/023* (2013.01)
(58) Field of Classification Search
  CPC .... B60H 2001/2228; B60H 2001/2246; B60H 2001/2256; F24H 1/121; F24H 9/2014; F24H 9/2071
  USPC .................................. 219/200, 201, 202.205
  See application file for complete search history.

(56) References Cited

U.S. PATENT DOCUMENTS

| 6,021,752 | A | * | 2/2000 | Wahle | B60H 1/2209 123/142.5 R |
| 6,779,737 | B2 | * | 8/2004 | Murray | B60H 1/00314 237/12.3 R |
| 7,909,509 | B2 | * | 3/2011 | Mau | G01K 1/16 324/500 |
| 2002/0046831 | A1 | * | 4/2002 | Humburg | B60H 1/2209 165/202 |
| 2006/0102744 | A1 | * | 5/2006 | Arkasjevski | B05B 9/002 239/128 |
| 2008/0226474 | A1 | * | 9/2008 | Yoshida | F04D 13/0666 417/366 |
| 2009/0151107 | A1 | * | 6/2009 | Shank | B05B 9/002 15/250.05 |
| 2013/0180973 | A1 | * | 7/2013 | White | H05K 7/20 219/209 |

FOREIGN PATENT DOCUMENTS

| EP | 2772375 A1 | 9/2014 |
| JP | H1168263 A | 3/1999 |
| JP | 4474754 B2 | 6/2010 |
| JP | 2014170772 A | 9/2014 |
| WO | 9623397 A1 | 8/1996 |

OTHER PUBLICATIONS

PCT International Search Report, PCT/EP2015/074013, dated Dec. 23, 2015.
PCT International Preliminary Report on Patentability, PCT/EP2015/074013, dated Apr. 25, 2017.

* cited by examiner

HEATING DEVICE WITH INTEGRATED TEMPERATURE SENSOR

CROSS-REFERENCE TO RELATED APPLICATIONS

This application represents the national stage entry of PCT International Application No. PCT/EP2015/074013 filed Oct. 16, 2015, which claims priority to German Patent Application Serial No. 10 2014 015 586.2 filed Oct. 21, 2014, the contents of which are hereby incorporated herein by reference for all purposes.

The present invention relates to a heating device, in particular an electric heating device for a motor vehicle, having an integrated temperature sensor.

The object of the present invention is to detect overheating of a heating device reliably, efficiently and quickly.

A heating device is described, in particular an electric heating device for a motor vehicle, having a heat exchanger housing, a heat exchanger core which absorbs heat at a heat input face, and a printed circuit board supporting electronic components for controlling the heating device, wherein the printed circuit board is arranged on an outer side of the heat exchanger housing, wherein a temperature sensor is arranged on a side of the printed circuit board which faces the outer side of the heat exchanger housing, wherein connecting means are provided, which connect the temperature sensor in a heat-conducting fashion to the outer side of the heat exchanger housing, and wherein the heat input face of the heat exchanger core is connected in a heat-conducting fashion to the heat exchanger housing, with the result that a continuous short thermal bridge from the heat input face to the connecting means is generated, which thermal bridge runs through the interior of the heat exchanger housing. A surface region of the heat exchanger core at which heat generated during operation of the heating device enters or is transferred into the heat exchanger core can be referred to as a heat input face of the heat exchanger core. The heat input face can be for example a surface of the heat exchanger core which delimits a combustion chamber in which hot combustion exhaust gases are generated. The heat input face can also be for example a surface of the heat exchanger core which supports an electrical film heating element. The thermal bridge to be generated can also be referred to as short if it is at least close to the direct shortest connection in terms of a linear distance between the heat input face and the connecting means. The thermal bridge can be regarded as continuous if the thermal bridge does not contain any gaps in which, for example, coolant to be heated flows. As a result of the heat-conducting connection of the heat input face of the heat exchanger core to the heat exchanger housing in the proximity of the connecting means which connect the temperature sensor in a heat-conducting fashion to the outer side of the heat exchanger housing, a short direct thermal bridge is provided between the temperature sensor and the hottest region of the heating device, i.e. the heat input face of the heat exchanger core. It is thereby possible for a change in temperature at the heat input face to be detected quickly and reliably at the temperature sensor as a result of the short continuous thermal bridge provided. In particular, an increase in temperature in the region of the heat exchanger core, for example an undesired impermissible overheating, is thereby registered in a minimum time as a result of a corresponding increase in temperature in the region of the temperature sensor. Since the temperature sensor is furthermore arranged outside the heat exchanger housing, the construction of the heat exchanger can be kept simple. The connecting means can provide a physical attachment of the temperature sensor to the outer side of the heat exchanger housing. The connecting means can, for example, comprise or consist of a material with good heat-conductivity, for example filled silicone. The connecting means can be introduced into the desired region between the outer side of the heat exchanger housing and the temperature sensor for example with the aid of a dispensing method. The heat-conducting material here, for example a dispensable paste, can be dispensed from a dispenser and applied to a desired connecting point between the heat exchanger housing and the temperature sensor. The expression "in the proximity" can refer in particular to a small spatial distance, wherein the distance is generally viewed in the plane perpendicular to the shortest connecting line between the temperature sensor and the outer side of the heat exchanger housing. The heating device can be for example a fuel operated or an electrically operated heating device. The heat input face of the heat exchanger core can be for example a surface of the heat exchanger core which is spatially the furthest away from the outer side of the heat exchanger housing. It is possible for the heat input face and the outer side of the heat exchanger housing to delimit the heat exchanger at mutually opposing sides. The heat input face can therefore be located on an outer side of the heat exchanger formed by the heat exchanger core and the heat exchanger housing, which outer side is opposite the outer side of the heat exchanger in the spatial proximity of which the temperature sensor is arranged. The electrical film heating element can be an electrical heating film which is connected to at least one first electrical connection point, which is connected or connectable to a positive terminal of a voltage source, and at least one second electrical connection point, which is connected to an earth terminal of the voltage source. An electrical insulation film can be arranged between the electrical heating film and the heat exchanger core, which insulation film electrically insulates the heat exchanger core at least partly with respect to the electrical heating film, wherein the electrical insulation film can be interrupted at the at least one second electrical connection point and electrically connected to the electrical heating film in order to connect the electrical heating film in an electrically conductive fashion to the earth terminal of the voltage source. It is thereby possible for the at least one first electrical connection point to be connected in a simple fashion to the earth terminal of the voltage source via the heat exchanger core, when the heat exchanger core is electrically conductive, without needing to provide electrical connections which may be disruptive and/or expensive to manufacture. In the event that the electrical heating film comprises a plurality of mutually separate first electrical connection points, which can be the case for example when the electrical heating film comprises a plurality of mutually independent conductor tracks, these can be collectively connected to the earth terminal of the voltage source via the heat exchanger core with the result that the number of electrical connections to be produced is reduced. In this connection, it can be assumed that, as a result of interrupting the electrical insulation film at the at least one second electrical connection point, the electrically conductive connection between the heat exchanger core and the electrical heating film is "automatically" achieved during the production of the electric heating device as a consequence of the selected manufacturing methods and/or the selected dimensions of the constituent parts of the electric heating device, without the need for additional assembly steps. The heating device can be provided to heat a medium or a volume directly or indirectly. A volume to be heated can be for example a passenger area of a vehicle. A medium to be heated can be for example a heat exchanging fluid, for instance a gas such as air or a liquid such as water or a water/alcohol mixture, for example a water/glycol mixture. The electrical heating film in conjunction with the electrical insulation film can be regarded as an electrical film heating element. The heat exchanger core can be in contact with the medium to be heated or the volume to be heated on the one hand and with the film heating element on the other. The thermal output of individual conductor tracks in a film heating element can be low, with the result that a relatively large number of mutually independent conductor tracks can be brought together in a relatively large film heating element of the electric heating device to achieve a desired heat output. The electrical connections needed to operate the individual conductor tracks of the film heating element can be arranged, at least in some cases, individually on the respective conductor track of the film heating element. Electric heating devices having film heating elements can be used for example in highly efficient hybrid or electric cars to avoid the direct combustion of fossil fuels for heating the vehicle interior. In this connection, small heating devices which are simple to manufacture are particularly desirable. The voltage source can optionally provide an AC voltage or a DC voltage. The voltage source can furthermore provide the voltage needed to operate the heating device in either the low-voltage or high-voltage range. The electrical voltage provided by the voltage source can also be converted into a preferred voltage for operating the electric heating device, for example in a control device associated with the electric heating device. The electric heating device can be arranged in a housing which can in turn be arranged for example in a vehicle. The housing can be regarded as part of the electric heating device and can provide, for example, any necessary electrical insulation and/or a guideway for the medium to be heated. Provision can be made for an electrical insulation film to be deposited directly onto the heat input face of the heat exchanger core. In the present case, the expression "deposited directly" can refer in particular to the application of the electrical insulation film to the heat input face of the heat exchanger with the aid of a thermal spray or sputtering method. A thermal spray method can be for example plasma spraying, cold gas spraying, flame spraying and/or suspension flame spraying. It is alternatively possible to also use other coating methods which likewise enable a direct deposition/application of a thin electrical insulation film. If an electrical insulation film is present, provision can be made for the electrical heating film to be deposited directly onto the electrical insulation film. If the electrical insulation film is present, the electrical heating film can also be deposited directly onto the heat input face of the heat exchanger core at the at least one second electrical connection point. The electrical heating film can also be deposited as a thin film directly onto the electrical insulation film and the interruption of the electrical insulation film, which is provided as a second electrical connection point. The thermal spray or sputtering method already mentioned above can likewise be used here to deposit the film. Provision can be made for the heat exchanger core to be electrically conductive or to comprise an electrically conductive earth connection face. In particular, if the heat exchanger core is electrically insulating, an electrically conductive earth connection face can be provided on its surface via which the electrical connection to an earth terminal of the voltage source can be realized and which reaches into the region of the heat input face. The earth connection face can, in particular, also be deposited onto the heat exchanger core in a spray or sputtering method.

Provision can also be made for the heat exchanger core to comprise a metallic material, in particular aluminum or an aluminum alloy. The metallic material can, in particular, combine the high thermal conductivity advantageous for the heat exchanger core with an electrical conductivity. Provision can be made for the electrical insulation film to comprise a ceramic film, in particular a ceramic film of aluminum oxide. Ceramic films can be applied directly to the heat exchanger core in a simple fashion, wherein they can form a permanent fixed connection with the heat exchanger core, thereby ensuring a good heat exchange between the electrical heating film and the heat exchanger core in the region of the heat input face. The ceramic film is furthermore also connected to the surface of the heat exchanger core in a sufficiently stable fashion in order to compensate stresses which occur during heating or cooling. In particular, this property can be a result of at least similar thermal expansion coefficients of the heat exchanger core and the insulating film. Provision can be made for the electrical heating film to comprise a metallic material, in particular nickel or a nickel alloy.

Nickel or nickel alloys can be readily formed as sufficiently temperature-stable ohmic heating resistors. Provision can be made for the electrical heating film to be structured in a film plane of the electrical heating film and to comprise at least two mutually independent resistance heating elements. It is thereby possible for a plurality of mutually independent resistance heating elements formed as film heating elements to be collectively applied directly to the heat input face of the heat exchanger core in a small number of manufacturing steps which are not dependent on the number of resistance heating elements. Individual resistance heating elements can be realized for example in the form of conductor tracks in the heating film, wherein these conductor tracks are arranged at a distance from one another in the heating film and can each have separate electrical connection contacts. To simplify the electrical contacting, these electrical connection contacts can be brought together and collectively connected to the voltage source. The electrical film heating element can be supplied with electrical power in a pulse-width modulated fashion, for example, to regulate the heat output. The electric heating device can be designed as a high-voltage electric heating device. A high-voltage electric heating device of this type can be supplied and operated with a high supply voltage. The high supply voltage can be for example at least 100 volts. The high supply voltage can be in a voltage range referred to as a high-voltage range, which starts at 100 volts. The electric heating device can be provided for example as a heating device for an electric or hybrid vehicle. The electric heating device can be suitable for operation on a high-voltage vehicle electrical system of an electric or hybrid vehicle. In this connection, the electric heating device can be particularly suitable for being operatively connected to the high-voltage vehicle electrical system of an electric or hybrid vehicle directly, i.e. without the interconnection of voltage converters which limit the maximum voltage supply that can be supplied to the electric heating device from the high-voltage vehicle electrical system, for example.

Provision can be made for the thermal bridge between the heat input face of the heat exchanger core and the connecting means to comprise a connection between the heat exchanger housing and the heat exchanger core. The connection can be for example a form-fitting and/or a force-fitting connection.

Provision can also be made for the connection to be a substance bonded connection. A substance bonded connection between the heat exchanger core and the heat exchanger housing can be generated for example by bonding and/or welding. As a result of welding the heat exchanger core to the heat exchanger housing in the region of the shortest distance between the outer side of the heat exchanger housing and the temperature sensor, a particularly good heat conductivity between the heat exchanger core and the heat exchanger housing is achieved at the connecting point. A good heat-conducting connection between the heat exchanger core and the heat exchanger housing for forming the desired thermal bridge can be also be achieved by bonding the heat exchanger core to the heat exchanger housing at the point referred to above. Bonding can be provided in addition or alternatively to welding.

Provision can also be made for the heat exchanger housing to have a reduced wall thickness in the proximity of the connecting means compared to the rest of the heat exchanger housing. As a result of providing a reduced wall thickness in the proximity of the connecting means, the heat capacity of the thermal bridge formed between the heat exchanger core and the temperature sensor can be reduced with the result that overheating in the region of the heat exchanger core can be detected more quickly by the temperature sensor. On the outer side of the heat exchanger housing, the region of the reduced wall thickness on the heat exchanger housing can form a depression, as seen from the printed circuit board, which is located in the spatial proximity of the temperature sensor arranged on the printed circuit board and in which the connecting means used, which are applied using a dispensing method, can preferably collect.

Provision can be made for the temperature sensor to be an SMD sensor. SMD stands for "surface mounted device" and refers to a temperature sensor which is mounted directly on the board and is soldered directly to the printed circuit board. It is possible to dispense with additional housings, wiring, plugs or the like. The mass of the SMD temperature sensor can be correspondingly low with the result that the heat capacity of the temperature sensor is very low and overheating in the region of the heat exchanger core is promptly detected by the temperature sensor.

Provision can be made for the electronic components to be arranged on a side of the printed circuit board which faces away from the outer side of the heat exchanger housing. By arranging the electronic components on the side of the printed circuit board which faces away from the outer side of the heat exchanger housing, the ambient temperature of the electronic components can be reduced. In particular, the relatively large distance between the electronic components and the outer side of the heat exchanger housing can contribute to reducing the ambient temperature of the electronic components.

Provision can be made for the electronic components to be arranged at a distance from the temperature sensor in the plane of the printed circuit board. It is thereby likewise possible to reduce the ambient temperature of the electronic components since the electronic components are arranged further away from the desired thermal bridge between the outer side of the heat exchanger housing and the temperature sensor.

Provision can be made for the printed circuit board to have regions having different heat conductivity, and for at least the region of the printed circuit board on which the temperature sensor is arranged to have a reduced heat conductivity compared to the other regions of the printed circuit board. A different heat conductivity can be realized for example by regions of the printed circuit board having different thicknesses. The heat conductivity in a particular direction within the printed circuit board is codetermined by the available cross-section of the printed circuit board, which is directly proportional to the thickness of the printed circuit board. The provision of drilled/milled holes through the printed circuit board can likewise reduce the available average cross-sectional area in some regions of the printed circuit board.

The heating device described above can be arranged and used in particular as a heating device in a motor vehicle.

The invention will now be explained by way of example with reference to the accompanying drawings with the aid of preferred exemplary embodiments.

Figure 2:
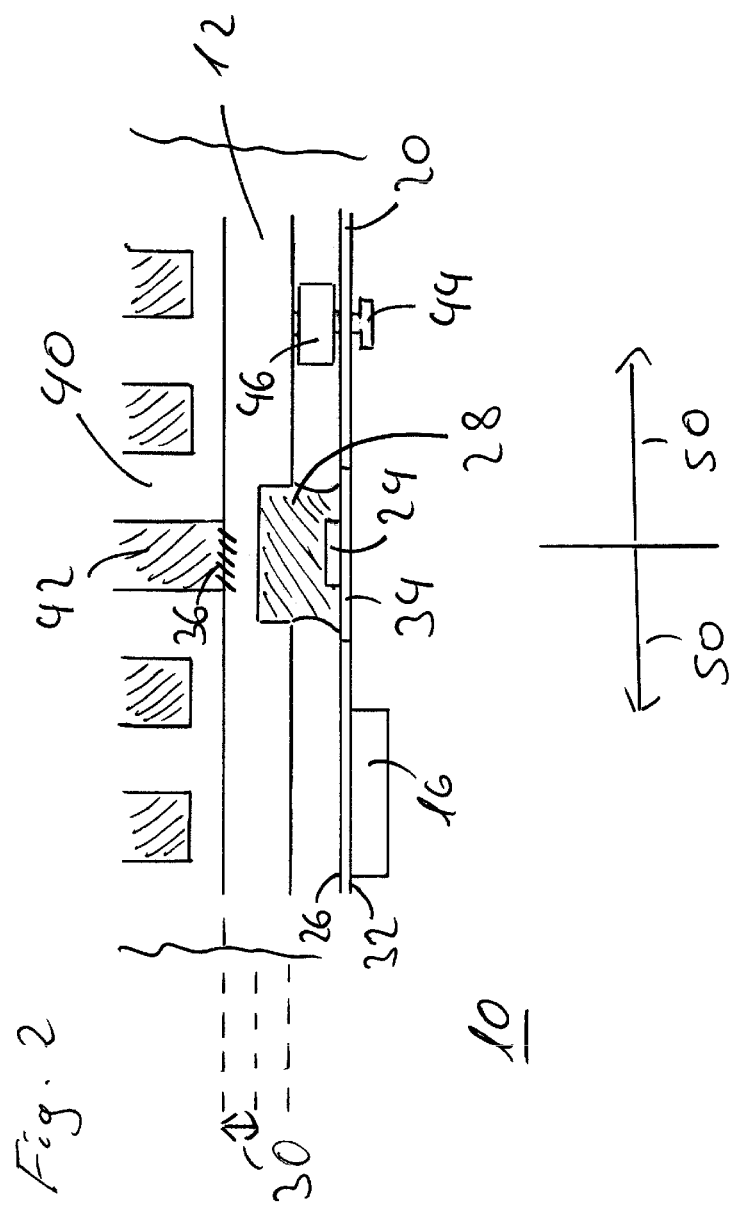

The drawings show:

FIG. 1 a three-dimensional sectional view of a detail of a heating device; and FIG. 2 a sectional side view of a detail of a heating device.

In the description below of the drawings, the same reference numerals denote the same or similar parts.

FIG. 1 shows a three-dimensional sectional view of a detail of a heating device. The illustrated heating device 10 comprises a heat exchanger core 14, which can be arranged for example in the interior of a heat exchanger housing 12. The heat exchanger core 14 and the heat exchanger housing 12 can collectively form a heat exchanger. The heat exchanger housing 12 can at least partly delimit the heat exchanger to the outside. The heat exchanger core can likewise at least partly provide outer faces of the heat exchanger formed. A side of the heat exchanger housing 12 which faces away from the heat exchanger core 14 can be regarded as an outer side 22 of the heat exchanger housing 12. The heat exchanger core 14 can have physical connections 36 to the heat exchanger housing 12, at least in some regions. The heat exchanger core 14 can comprise ribs 42 between which clearances 40 are present. In the clearances 40, a medium to be heated, for example a coolant to be heated, can flow along the heated heat exchanger core 14. An electrical heating element can be arranged separately from the clearances 40, for example on the heat exchanger core 14. The face covered by the electrical heating element can be regarded as a heat input face via which heat arrives in the heat exchanger core 14 during operation of the heating device 10. In the event that the heating device 10 is fuel operated, a surface of the heat exchanger core 14 which delimits a combustion chamber can be regarded as the heat input face. The heat input face of the heat exchanger core 14 illustrated in FIG. 1 can be located for example on the rear side of the spine 48 connecting the ribs 42, which rear side faces away from the outer side 22. This rear side can, at the same time, form an outer side of the heat exchanger. The connections 36 between the heat exchanger core 14 and the heat exchanger housing 12 can be for example form-fitting and/or force-fitting and/or substance bonded connections. It is possible to generate a particularly narrow connection by welding and/or bonding the heat exchanger housing 12 to the heat exchanger core 14 at a connecting point. It is thereby possible to generate an efficient thermal bridge between the heat exchanger core 14 and the heat exchanger housing 12 at the connecting point, via which thermal bridge the heat is quickly transported to the outer edge of the heat exchanger, i.e. to the outer side 22.

Necessary electronic components 16, 18 for controlling/regulating the heating device 10 can be arranged on a printed circuit board 20. The printed circuit board 20 can be arranged at a preferably defined distance from the outer side 22 of the heat exchanger housing 12, in particular via a device which is not visible in FIG. 1. The electronic components 16, 18 can be arranged on a side 32 of the printed circuit board 20 which faces away from the outer side 22 of the heat exchanger housing 12. A temperature sensor 24, which can be for example an SMD temperature sensor, can be arranged on a side of the printed circuit board 20 which is opposite the facing-away side 32. The side of the printed circuit board 20 which is opposite the facing-away side 32 can be a side 26 which faces the outer side 22 of the heat exchanger housing 12. The printed circuit board 20 can be protected from undesired external influences by a cover 38. The desired physical thermal bridge between the temperature sensor 24 and the heat exchanger, in particular the heat-conducting connection between the heat exchanger housing 12 and the temperature sensor 24, can be provided by connecting means 28. The connecting means 28 can be dispensed into the desired region between the heat exchanger housing 12 and the printed circuit board 20, for example with the aid of a dispensing method. The connecting means 28 can be for example silicone with good heat conductivity.

FIG. 2 shows a sectional side view of a heating device. The heating device 10 illustrated in FIG. 2 has a slightly modified construction compared to the heating device illustrated in FIG. 1. The ribs 42 of the heat exchanger core 14 have different lengths, with the result that clearances 40, which separate the short ribs 42 from the heat exchanger housing 12, are produced in the regions which are further away from the temperature sensor 24. It is thereby possible to reduce the temperature of the heat exchanger housing 12 outside of the temperature sensor 24 with the result that energy losses are minimized. A reduced wall thickness 30 of the heat exchanger housing 12 in the proximity of the temperature sensor 24 is furthermore shown in FIG. 2. The reduced wall thickness 30 in this region reduces the heating capacity of the heat exchanger housing 12 locally, with the result that temperature fluctuations within the heat exchanger, in particular within the heat exchanger core 14, can be detected more quickly by the temperature sensor 24. The application of the connecting means 28, which can take place in particular with the aid of a dispensing method, can furthermore be simplified since the connecting means can readily collect in an externally visible depression in the region of the reduced wall thickness 30. The proximity to the temperature sensor 24 is understood in particular to be a small distance 50 in the plane perpendicular to the shortest connection between the temperature sensor 24 and the outer side 22 of the heat exchanger housing 12. The printed circuit board 20 can be screwed to the outer side 22 of the heat exchanger housing 12 with the aid of screws 44 using buffers 46. The buffers 46 can be resilient, for example. The buffers 46 can be heat insulating, for example. The printed circuit board 20 can comprise a region 34 in the proximity of the temperature sensor 24 which has a reduced heat conductivity compared to the rest of the printed circuit board 20. It is thereby possible for the operating temperature of the electronic components 16, 18 to be kept low despite there being a direct thermal bridge to the heat exchanger core 12 in the region of the temperature sensor 24.

The features of the invention which are disclosed in the description above, in the drawings and in the claims, can be fundamental to the realization of the invention both individually and also in any combination.

LIST OF REFERENCE SIGNS

10 Heating device
12 Heat exchanger housing
14 Heat exchanger core
16 Electronic component
18 Electronic component
20 Printed circuit board
22 Outer side
24 Temperature sensor
26 Facing side
28 Connecting means
30 Reduced wall thickness
32 Facing-away side
34 Region
36 Connection
38 Cover
40 Clearance
42 Rib
44 Screw
46 Buffer
48 Spine
50 Distance

The invention claimed is:

1. A heating device for a motor vehicle, saki heating device comprising:
    a heat exchanger housing;
    a heat exchanger core absorbing heat at a heat input face connected to said heat exchanger housing;
    a printed circuit board supporting electronic components for controlling the heating device, wherein the printed circuit board is arranged on an outer side of the heat exchanger housing;
    a temperature sensor arranged on a side of the printed circuit board, said side of said printed circuit board facing an outer side of the heat exchanger housing; and
    a connector connecting the temperature sensor in a heat-conducting fashion to the outer side of the heat exchanger housing, wherein the heat input face of the heat exchanger core is connected in the heat-conducting fashion to the heat exchanger housing, with a result that a continuous short thermal bridge to the connector is generated, which thermal bridge runs through the interior of the heat exchanger housing, wherein the temperature sensor is an SMD sensor that is arranged directly on the printed circuit board; and
    wherein the printed circuit board has regions having different heat conductivity by providing different cross sections in different directions for affecting a heat flow within the printed circuit board, and wherein at least a region of the printed circuit board on which the temperature sensor is arranged has a reduced heat conductivity compared to other regions of the printed circuit board.

2. The heating device as claimed in claim 1, wherein the thermal bridge between the heat input face of the heat exchanger core and the connector includes a connection between the heat exchanger housing and the heat exchanger core.

3. The heating device as claimed in claim 2, wherein the connection is a substance bonded connection.

4. The heating device as claimed in claim 1, wherein the electronic components are arranged on a side of the printed circuit board which faces away from the outer side of the heat exchanger housing.

5. The heating device as claimed in claim 4, wherein the electronic components are arranged at a distance from the temperature sensor in a plane of the printed circuit board.

6. The heating device as claimed in claim 1, wherein the heat exchanger housing has a reduced wall thickness proximal the connector compared to adjacent portions of the heat exchanger housing.

7. A motor vehicle having a heating device as claimed in claim 1.

* * * * *

UNITED STATES PATENT AND TRADEMARK OFFICE
CERTIFICATE OF CORRECTION

PATENT NO.       : 11,046,151 B2
APPLICATION NO.  : 15/520539
DATED            : June 29, 2021
INVENTOR(S)      : Daniel Eckert et al.

It is certified that error appears in the above-identified patent and that said Letters Patent is hereby corrected as shown below:

In the Claims

Column 8, Claim 1, Line 20, "saki" should be --said--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*